(12) United States Patent
Ashe

(10) Patent No.: US 11,449,525 B2
(45) Date of Patent: Sep. 20, 2022

(54) FACILITATING MOBILE DEVICE INTERACTION WITH AN ENTERPRISE DATABASE SYSTEM

(71) Applicant: salesforce.com, inc., San Francisco, CA (US)

(72) Inventor: Subrata Ashe, Walnut Creek, CA (US)

(73) Assignee: Salesforce, Inc., San Francisco, CA (US)

(*) Notice: Subject to any disclaimer, the term of this patent is extended or adjusted under 35 U.S.C. 154(b) by 118 days.

(21) Appl. No.: 16/775,024

(22) Filed: Jan. 28, 2020

(65) Prior Publication Data
US 2020/0265065 A1 Aug. 20, 2020

Related U.S. Application Data

(63) Continuation of application No. 15/666,296, filed on Aug. 1, 2017, now Pat. No. 10,579,641.

(51) Int. Cl.
| | |
|---|---|
| G06F 7/00 | (2006.01) |
| G06F 16/27 | (2019.01) |
| H04L 67/10 | (2022.01) |
| H04L 67/02 | (2022.01) |
| G06F 16/21 | (2019.01) |
| G06F 16/9535 | (2019.01) |
| G10L 15/22 | (2006.01) |
| G06F 16/9032 | (2019.01) |
| G06F 16/2452 | (2019.01) |

(52) U.S. Cl.
CPC ............ *G06F 16/27* (2019.01); *G06F 16/219* (2019.01); *G06F 16/90332* (2019.01); *G06F 16/9535* (2019.01); *G10L 15/22* (2013.01); *H04L 67/02* (2013.01); *H04L 67/10* (2013.01); *G06F 16/24522* (2019.01)

(58) Field of Classification Search
CPC .. G06F 16/27; G06F 16/219; G06F 16/90322; G06F 16/9535; G06F 16/24522; G10L 15/22; H04L 67/02; H04L 67/10
USPC .................................................. 707/600–899
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

OTHER PUBLICATIONS

U.S. Notice of Allowance dated Mar. 7, 2018 issued in U.S. Appl. No. 15/666,283.

(Continued)

*Primary Examiner* — Isaac M Woo
(74) *Attorney, Agent, or Firm* — Weaver Austin Villeneuve & Sampson LLP

(57) ABSTRACT

Disclosed are systems, methods, apparatus and computer program products for facilitating voice-based interaction by a mobile device with an enterprise database. In some implementations, a command and a type of enterprise work record are identified in a first one or more voice signals obtained at the mobile device. One or more fields of the identified record type required by the enterprise database to be populated to carry out the identified command is determined. Field data can be identified in a second one or more voice signals obtained at the mobile device. Structured text data comprising the identified command, the identified record type and the identified field data can be sent to a server.

20 Claims, 11 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,961,519 B1 | 5/2018 | Ashe |
| 10,579,641 B2 | 3/2020 | Ashe |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |

(56) References Cited

U.S. PATENT DOCUMENTS

| | | |
|---|---|---|
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0019365 A1* | 1/2015 | Vieira ............... G06Q 30/0611 705/26.3 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2018/0018961 A1 | 1/2018 | Lee et al. |
| 2018/0336317 A1* | 11/2018 | Carbonell ............... G06F 40/30 |
| 2019/0042601 A1 | 2/2019 | Ashe |

OTHER PUBLICATIONS

U.S. Office Action dated Jul. 2, 2019 issued in U.S. Appl. No. 15/666,296.

U.S. Notice of Allowance dated Oct. 17, 2019 issued in U.S. Appl. No. 15/666,296.

"Google Plus Users", Google+Ripples, Oct. 31, 2011 [retrieved on Feb. 21, 2012 from Internet at http://www.googleplusers.com/google-ripples.html], 3 pages.

* cited by examiner

US 11,449,525 B2

FACILITATING MOBILE DEVICE INTERACTION WITH AN ENTERPRISE DATABASE SYSTEM

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This patent document generally relates to interaction by a mobile device with an enterprise database system. More specifically, this patent document discloses techniques for text-based and voice-based communications for interacting with enterprise database records using a mobile device.

BACKGROUND

"Cloud computing" services provide shared network-based resources, applications, and information to computers and other devices upon request. In cloud computing environments, database services can be provided by servers to users' computer systems via the Internet and wireless networks rather than installing software locally on users' computer systems. A user can interact with database systems, email systems and instant messaging systems, by way of example, in a cloud computing environment.

BRIEF DESCRIPTION OF THE DRAWINGS

The included drawings are for illustrative purposes and serve only to provide examples of possible structures and operations for the disclosed systems, apparatus, methods and computer program products. These drawings in no way limit any changes in form and detail that may be made by one skilled in the art without departing from the spirit and scope of the disclosed implementations.

DETAILED DESCRIPTION

Figure 1:
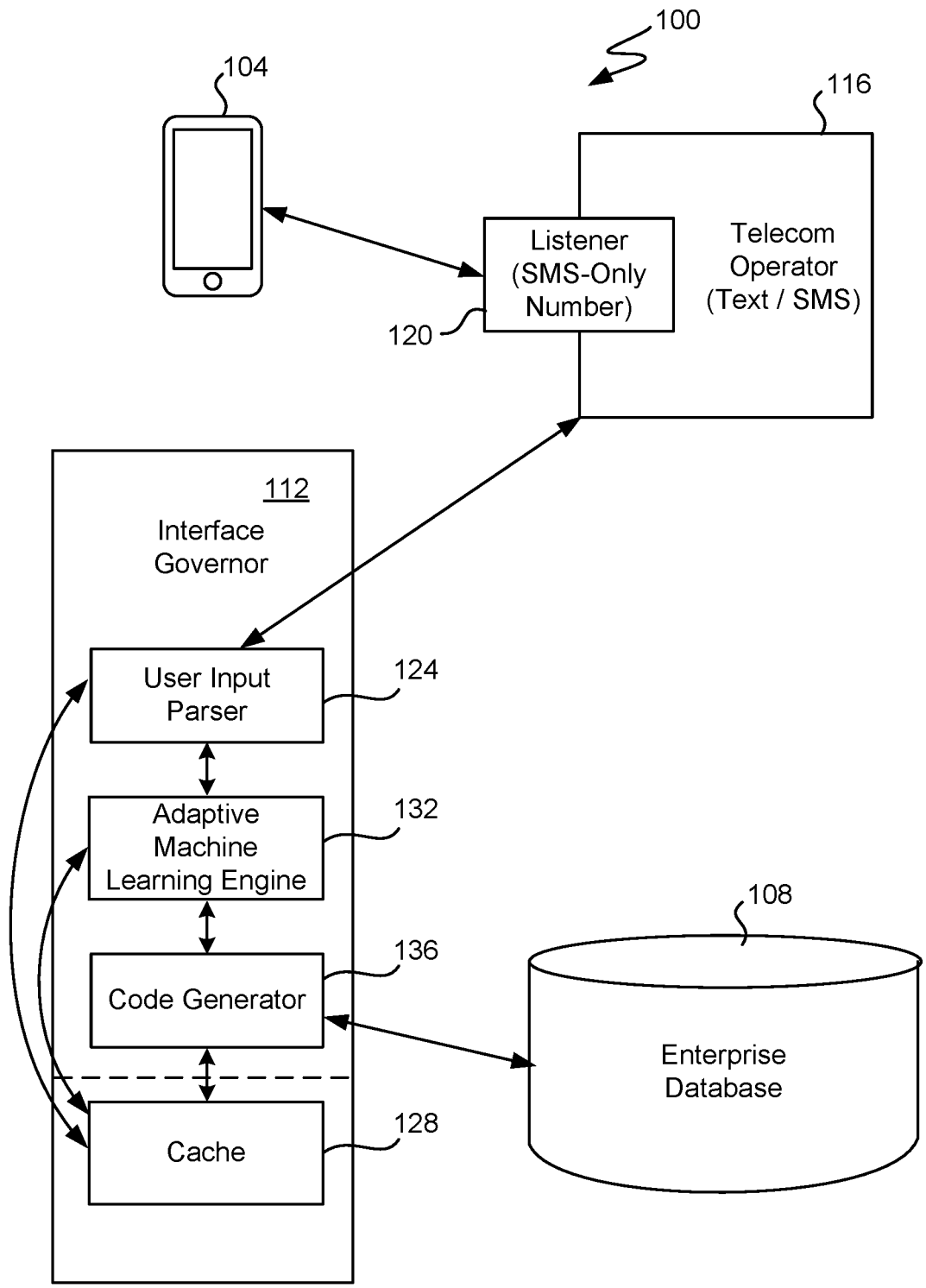
FIG. 1 shows a block diagram of an example of a text-based system 100 for facilitating interaction by a mobile device with an enterprise database, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some measures of current Internet usage indicate that less than 50% of the people on planet Earth use the Internet. The percentage of Internet users who access the Internet with mobile devices such as smartphones is near 100%. However, this mobile device base includes a significant number of feature phones, which are only capable of communicating over low-speed and low-bandwidth channels like Global System for Mobile communication (GSM) or Code-Division Multiple Access (CDMA). Feature phones can be generally characterized as lacking smartphone features available with higher-speed and higher-bandwidth networks like Long Term Evolution (LTE) or 4G. For instance, a feature phone generally has text and voice capabilities but lacks the ability to run apps with graphical output. Low-speed and low-bandwidth connections can impair the phones' ability to properly run apps and/or display images for interfacing with a database system such as a modern Customer Relationship Management (CRM) system. Also, even if a user has a modern smartphone rather than a feature phone, speed and bandwidth limitations can prevent the user from using apps with graphical output.

Some implementations of the disclosed systems, apparatus, methods and computer program products are configured to provide a virtual assistant for facilitating interaction by a mobile device with an enterprise database system incorporating a CRM database. The virtual assistant can have both text and voice modes of communication. Thus, a mobile device can request information from a CRM database as well as instruct that commands be carried out on database records using text or voice as the desired medium. For example, when text mode is used for the virtual assistant, a feature phone can effectively interact with the database. Voice mode can be desirable for data-enabled phones such as modern smartphones to interact with the database, particularly in lower-bandwidth environments (without LTE or 4G). In some environments, voice mode can also benefit users who are not trained to use a modern CRM app installed on the smartphone or who do not want to browse a website to interact with a CRM database. In some implementations, since both modes are available, smartphone users can choose whether to use text or voice to interact with the database.

In some implementations, an interface governor described in greater detail below is implemented on one or more servers. The interface governor generally serves as an interface between the mobile device and an enterprise database such as a CRM database. The interface governor can be configured to operate in both text and voice modes. That is, a mobile device can communicate with the same interface governor either through text or voice channels, as desired for the particular environment. As explained in greater detail below, text messages can be communicated between the mobile device and the interface governor through a Short Message Service-only (SMS-only) number provided by a telecommunications (telecom) operator. Voice signals can be processed on the mobile device and translated to text to send to the interface governor. As explained in greater detail below, a language builder including a natural language processor can be installed on the mobile device to process voice input from a user.

For text mode, a user can enter text and make text-based selections on the mobile device to communicate keywords such as commands and record types to the interface governor. For example, a text message can be generated on the mobile device to request that the interface governor identify any new opportunities, a type of CRM record, assigned to the user to work on. When the interface governor receives the text message through the SMS-only number, the interface governor can often retrieve identities of those opportunities from a cache at the interface governor when the opportunities were previously identified by the interface governor. If the requested CRM records are not in cache, the interface governor can fetch the records from the CRM database.

For voice mode, a voice recognition engine can be installed on the mobile device. In some implementations, the voice recognition engine can be integrated with a CRM app also installed on the mobile device. The voice recognition engine can incorporate artificial intelligence (AI) capabilities and be adapted to the user's voice. The voice recognition engine can listen to input voice signals, parse and process the signals and respond with audio output messages played through a speaker of the mobile device. A language builder implemented on the mobile device can recognize the voice, and a command generator implemented on the mobile device can generate a corresponding set of commands to send to the interface governor.

FIG. 1 shows a block diagram of an example of a text-based system 100 for facilitating interaction by a mobile device with an enterprise database, in accordance with some implementations. In FIG. 1, a mobile device 104 operated by a user can interact with an enterprise database 108, such as a CRM database, with communications facilitated by an interface governor 112 implemented on a server or combination of servers. The mobile device can be a handheld or portable computing device such as a smartphone or tablet. In the example of FIG. 1, communications between mobile device 104 and interface governor 112 are often textual. In particular, mobile device 104 is in communication with a telecom operator 116, which provides conventional text messaging services to mobile device 104. The interface governor 112 is also in communication with telecom operator 116. In this way, when mobile device 104 sends a text message to an SMS-only number 120, telecom operator 116 can relay the message to interface governor 112. By the same token, textual communications can be sent from interface governor 112 back to mobile device 104 through SMS-only number 120.

In FIG. 1, interface governor 112 is also configured to carry out communications by sending and receiving data to and from enterprise database 108 to perform various commands instructed by mobile device 104 on various records stored in database 108. In the example of FIG. 1, interface governor 112 and enterprise database 108 are both subsystems of a database system in which on-demand database services can be implemented.

In the example of FIG. 1, interface governor 112 can select and expose a particular application programming interface (API) or a subset of available APIs to enable and facilitate communications with mobile device 104 through telecom operator 116 and with enterprise database 108. For example, one or more APIs can be configured to receive and relay keywords in the form of commands and specified records and types of records in text messages sent from mobile device 104. By the same token, such APIs or a different subset of APIs can be configured to output data sets to telecom operator 116 for relaying to mobile device 104. A different API or subset of APIs can be configured and selected to allow interface governor 112 to send instructions and data to enterprise database 108 and receive data and notifications from enterprise database 108, for instance, in response to a database query or instruction to update a specified record. Those skilled in the art should appreciate that APIs used to facilitate communications between interface governor 112 and telecom operator 116 as well as APIs for communications between interface governor 112 and enterprise database 108 can be selected, configured and customized to enhance the relaying of messages, data and instructions to enhance the various techniques described in greater detail below.

In FIG. 1, interface governor 112 includes a user input parser 124, which is a listener configured to parse user input in the form of text messages sent from mobile device 104 through telecom operator 116. User input may include or identify a specific command, a record type, a record, a uniform resource locator (URL) and/or a login ID, by way of illustration. For instance, a user may type the command, "create", or a command paired with a record type, such as "create account". When a text message containing or identifying such keywords is received at interface governor 112, user input parser 124 can parse the text to identify the keyword(s). The identification of such keywords can trigger or further a workflow to create a new account in enterprise database 108.

In FIG. 1, interface governor 112 stores and uses a database table mapping specific keywords to actions and/or workflows to be taken to carry out various commands Such a table can be maintained in a local memory such as a cache 128 of interface governor 112. For example, such a table can be used to map the "create" command to a specific API used to instruct enterprise database 108 to create an object, while an "update" command can be mapped to a different API or subset of APIs configured to facilitate relaying of the "update" command to enterprise database 108 for updating a specified object.

In FIG. 1, when user input parser 124 parses text to identify a command and/or record type, for example, these keywords are passed to an adaptive machine learning engine 132, which is implemented to store and update historical data including various commands, record types and other keywords for current and future transactions. In this way, interface governor 112 can interact with mobile device 104 in a more effective and efficient manner as the user continues to interact with interface governor 112 through successive interactions with mobile device 104.

In FIG. 1, adaptive machine learning engine 132 is configured to be specific to a CRM environment or other enterprise-related environment. Any of the various standard and custom records and types of records frequently used in a CRM scenario such as accounts, opportunities, leads, contracts, contacts, tasks, etc. and the various commands to be carried out on such CRM records can be handled by adaptive machine learning engine 132. As mentioned above, as adaptive machine learning engine 132 monitors and records various commands and record types as identified in communications from mobile device 104 over a session or sequence of sessions, each specific command and record or record type is recorded and updated. In this way, for future transactions in which the same commands and/or record types are identified, interface governor 112 can process such commands and send communications back to mobile device 104 without having to query enterprise database 108 or otherwise communicate with enterprise database 108, in some implementations.

In some implementations, interface governor 112 is configured to retrieve a set of CRM records exposed to a particular user of mobile device 104. Also, a menu of available commands for that user can be relayed from interface governor 112 to mobile device 104 to prompt the user to select or otherwise specify a particular command. The user can be similarly prompted before or after command selection to specify a particular record or type of record to be acted upon. When such selections are relayed back to user input parser 124, the selections are parsed and validated for interface governor 112 to identify the command, identify the record or record type and generate instructions and sometimes additional prompts to carry out the command and any additional tasks in relation to the specified record.

In some implementations, interface governor 112 is configured to implement a priority model so a code generator 136 can generate code based on historical data identifying previous commands and other interactions with a specific record or type of record. The priority model can be leveraged to prioritize and quickly retrieve commands which are frequently used by the user, for instance, in a particular computing session or set of sessions over a designated time frame. By implementing the priority model, commands and record types which are infrequently used are given a lower priority or removed to simplify the user experience. The number of and details surrounding user input for a particular command can be minimized as can the number of communications and amount of data transmitted between interface governor 112 and enterprise database 108.

In FIG. 1, interface governor 112 operates in text mode to handle text-based user commands and specified record types. The user input parser 124 is configured to identify a user-selected command from a set of available commands and identify a specific record or record type from a set of available record types, often using the historical data maintained in cache 128. The adaptive machine learning engine 132 is configured to learn based on the various user selections and other input. The adaptive machine learning engine 132 has built-in intelligence to learn from user patterns and trends to prioritize and present the user with most-frequently-used options as monitored over a period of time.

As mentioned above, cache 128 of interface governor 112 can be used to minimize the frequency of queries to and other communications with enterprise database 108. The code generator 136 can communicate directly with cache 128 to generate CRM-specific code to select a particular record type or record as well as perform a user-specified command on the selection. The cache 128 can be used to maintain historical data storing all of the user commands as well as particular records or record types in a prioritized arrangement, for instance, until a current session times out or is otherwise terminated. When adaptive machine learning engine 132 passes a command and record type like "create account" to code generator 136, code generator 136 generates or retrieves from cache 128 the specific code to carry out or instruct enterprise database 108 to carry out creation of the account. Thus, code generator 136 generates code according to the specific keywords provided by the user input received from mobile device 104. Code generator 136 can use particular APIs to interface with enterprise database 108 to create the account and/or provide Java code to create the account. The cache 128 can be further leveraged by code generator 136 to store the code carrying out a specified command on a specified record or record type for later retrieval when a user wishes to carry out the same command on the same record or record type in the future.

Any updates separately carried out in enterprise database 108 can be relayed back to code generator 136 to update code generator 136 accordingly. For example, schema updates for a build at enterprise database 108 can be communicated to code generator 136, which can store the updates in cache 128. For example, a schema update can include a new mandatory field or fields for a record as well as one or more non-mandatory fields, which can be relayed back to code generator 136 and stored in cache 128. In this way, such field information can be retrieved as part of the communications between interface governor 112 and mobile device 104 without having to fetch such information from enterprise database 108.

Figure 2:
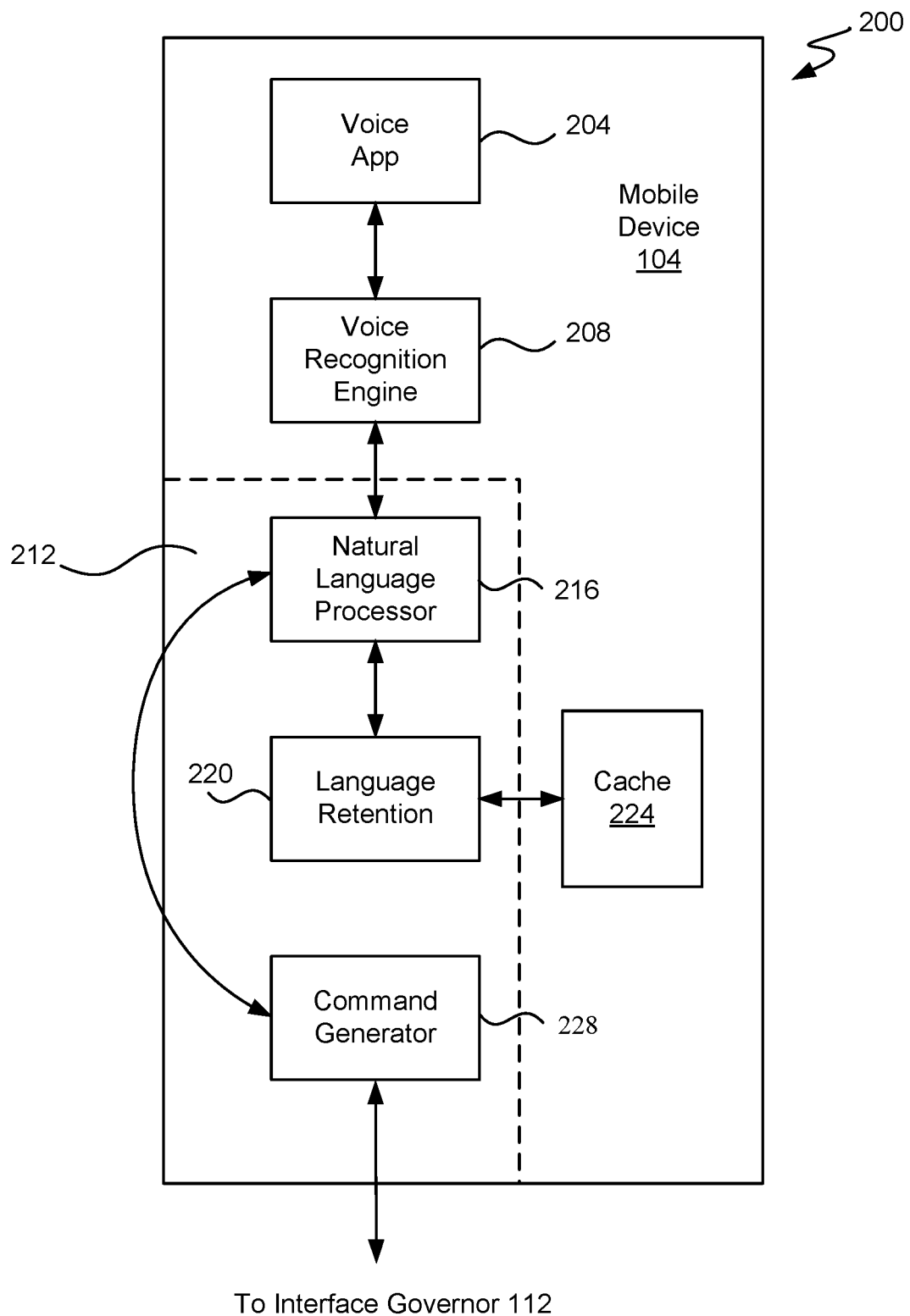
FIG. 2 shows a block diagram of an example of a voice-based system 200 for facilitating interaction by a mobile device with an enterprise database, in accordance with some implementations.

FIG. 2 shows a block diagram of an example of a voice-based system 200 for facilitating interaction by a mobile device with an enterprise database, in accordance with some implementations. In FIG. 2, various software and appropriate hardware is installed on a mobile device 104. The software includes apps such as a voice app 204 with which an end-user can interact. The voice app 204 has software components for receiving, processing and responding to a user's voice, for instance, when the user speaks into a microphone of mobile device 104 to generate a voice signal. In some implementations, voice app 204 is dedicated to facilitating user interaction with an enterprise database. In some other implementations, voice app 204 is configured with a variety of speech processing capabilities for various purposes and includes one or more modules dedicated to the disclosed techniques for facilitating user interaction with an enterprise database.

In FIG. 2, voice app 204 interacts with a voice recognition engine 208, which can be implemented using conventional voice recognition software. In some implementations, voice recognition engine 208 is a separate module from voice app 204, as shown in FIG. 2. In some other implementations, voice recognition engine 208 is an integral component of voice app 204. In FIG. 2, voice app 204 provides an audio interface for both prompting a user with audio request messages and receiving user input in the form of voice signals for selecting commands, specifying records, fields of records, mandatory field data, etc. Voice app 204 is configured to cooperate with voice recognition engine 208 to identify a user's voice input, process the input including parsing of keywords and pass the processed input to a language builder 212 installed on mobile device 104. To recognize what the user is saying, voice recognition engine 208 can be implemented to include one or more voice recognition algorithms, which can be tailored to the user's voice.

In FIG. 2, language builder 212 of mobile device 104 includes a natural language processor (NLP) 216, which is in communication with voice app 204 through voice recognition engine 208. NLP 216 is configured to process voice-based keywords received from voice recognition engine 208 and relay information back to voice app 204 after tasks are performed by language builder 212 and/or by interface governor 112 of FIG. 1.

In FIG. 2, language builder 212 also incorporates a language retention algorithm (LRA) 220 configured to retain keywords and associated data. Such can be useful, for instance, if the user's session expires before receiving data or an acknowledgement from interface governor 112, or if there are network interruptions. Language builder 212 can also incorporate a caching process, where LRA 220 can be configured to store and update lists of most-frequently-used keywords such as commands, record types, mandatory fields and associated data entries as historical data in a local memory such as a cache 224. In this way, such information can be retrieved locally at mobile device 104 for output to the user rather than having to query interface governor 112 of FIG. 1. In some implementations, LRA 220 can incorporate machine learning capabilities to associate specific commands like "update" with specific tasks or system events such as an account being updated 20 times on a given day. LRA 220 can leverage such machine learning to update and maintain prioritized lists of most-frequently-used commands and most-frequently-accessed record types in cache 224. Historical data in cache 224 can be retrieved to facilitate user interaction with the enterprise database, in some instances, without mobile device 104 having to request such information from interface governor 112.

By way of illustration, when a voice signal is generated by a user speaking "create account" into a microphone of mobile device 104, voice recognition engine 208 parses the voice signal to identify "create" as a command and "account" as a type of record. The voice recognition engine 208 passes the command and record type to NLP 216, which determines that the user is instructing that an account be created in a CRM environment, i.e., that a specific type of CRM record is to be acted upon, and that action is to create the record rather than perform some other CRM-related action on the record. LRA 220 retains the create command in association with account as the record type so, in the future, a "create account" instruction can be immediately identified by LRA 220.

When the user is prompted to speak the name of the account to be created or the user voluntarily speaks the account name, "Twitter" in this example, NLP 216 determines that a mandatory field of the account, the name in this example, is "Twitter." As further discussed herein, to determine such mandatory fields, keywords can be cross-referenced with standard objects and custom objects available to the user. The subset of available objects is often defined at least in part by the objects available to the enterprise with which the user is affiliated. When an available object is found, mandatory fields for carrying out the instructed command on that object are identified.

In FIG. 2, language builder 212 further includes a command generator 228, which is configured to communicate with user input parser 124 of interface governor 112 of FIG. 1. The command generator 228 of FIG. 2 can generate text messages including various keywords to be sent to interface governor 112. In this way, interface governor 112 of FIG. 1 can operate in similar fashion for both voice and text modes, as explained above. For instance, interface governor 112 can send prompts back to command generator 228 for mandatory or non-mandatory field data, and interface governor 112 can generate code to carry out creation of an account or another command at enterprise database 108 after mobile device 104 obtains and sends all of the mandatory field data entries to interface governor 112.

Figure 3A:
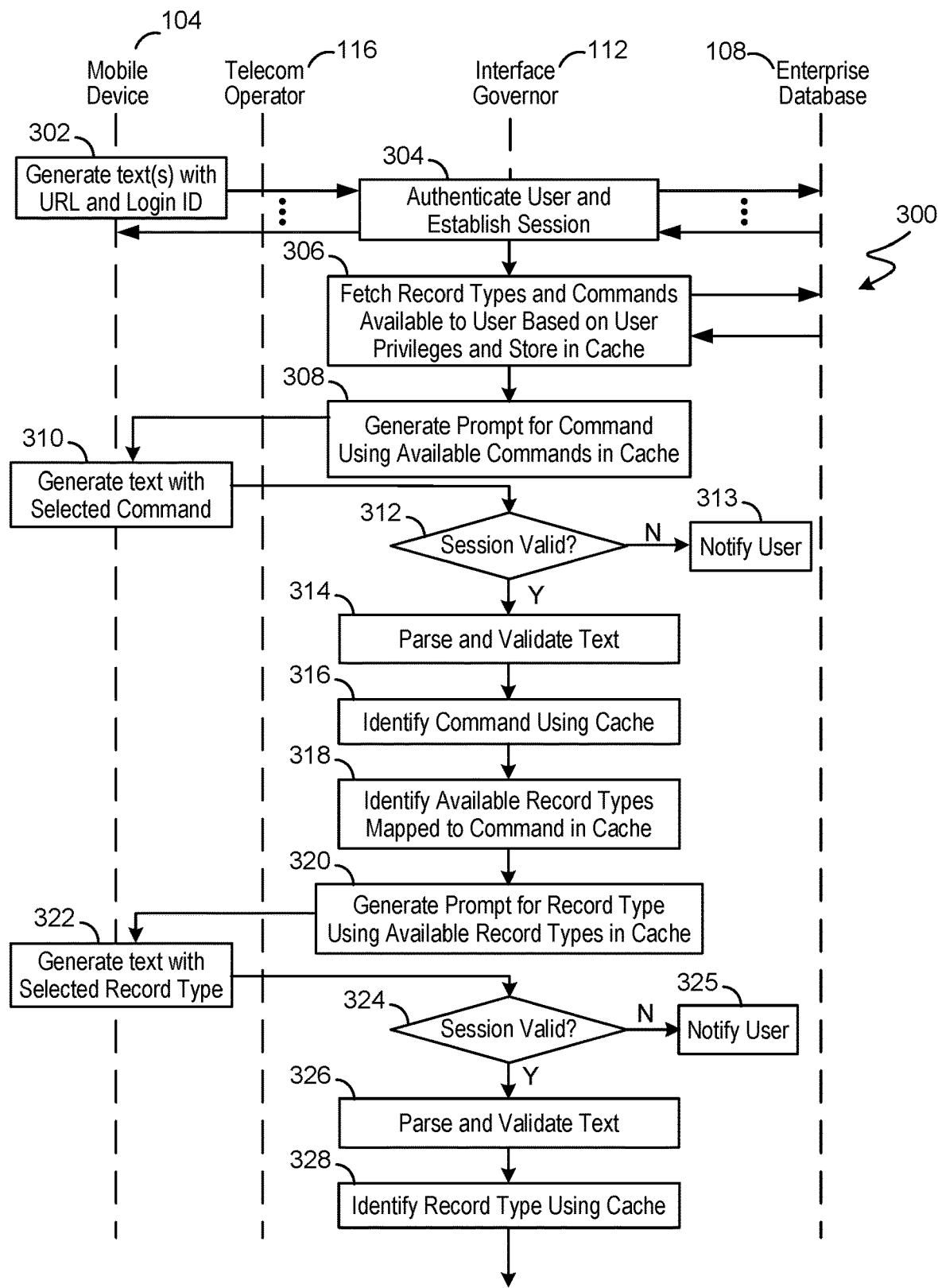
FIGS. 3A and 3B show a flowchart of an example of a method 300 for facilitating text-based interaction by a mobile device with an enterprise database, in accordance with some implementations.
Figure 3B:
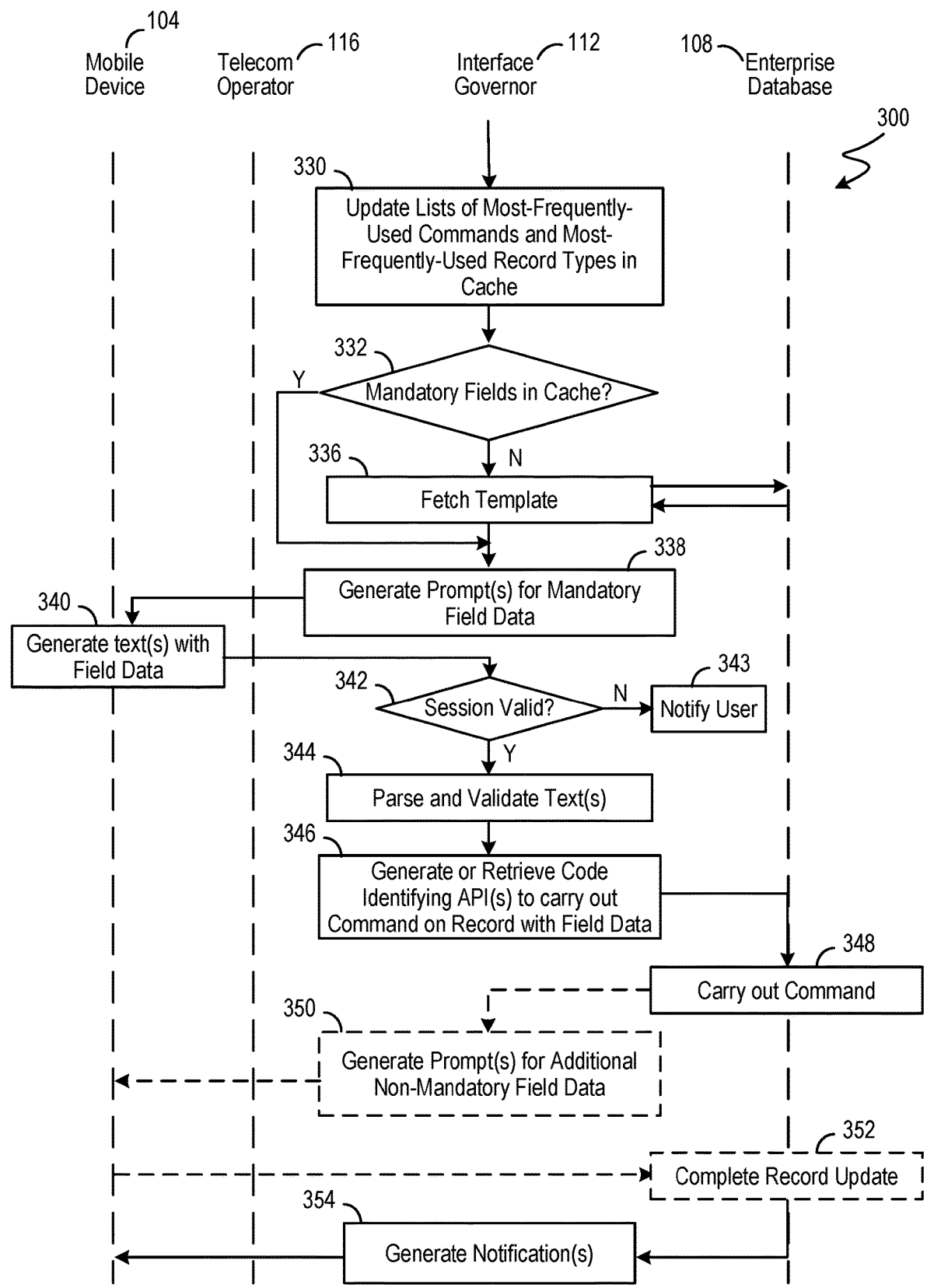

FIGS. 3A and 3B show a flowchart of an example of a method 300 for facilitating text-based interaction by a mobile device with an enterprise database, in accordance with some implementations. The method 300 of FIGS. 3A and 3B is described with reference to system 100 of FIG. 1, although those skilled in the art should appreciate that method 300 is not limited to the example of FIG. 1. At 302 of FIG. 3A, a user types in his or her login ID and password, which are captured as a text message and sent through telecom operator 116 to interface governor 112. For example, the URL entered by the user at 302 can identify a website of a provider of on-demand database services associated with interface governor 112. In the example of FIGS. 3A and 3B, method 300 is governed by an authenticated session ID. To this end, the receipt of a text message including a specified URL and login ID by interface governor 112 triggers user authentication and session management processes at 304. Examples of such processes are described in greater detail below and provide authentication of the user of mobile device 104 and the establishment of a particular session for the user to interact with enterprise database 108 through interface governor 112. In the example of FIGS. 3A and 3B, the establishment and existence of a session is a precursor to allowing the user's mobile device 104 to receive and display menus prompting the user to make selections and take other actions. In some implementations, for enhanced security, a timeout can be implemented, such as 30 minutes, for the user to make selections and otherwise respond to prompts to complete the updating of a record or execution of another command. As illustrated below, if the user makes appropriate selections to create a feedback record in enterprise database 108 but does not supply all of the mandatory fields for that record within the 30 minute timeout, the session established at 304 would end.

In some implementations, historical data maintained for that session would automatically be deleted upon termination of the session, and the user would have to start method 300 again. That is, operations at 302 and 304 would be repeated for the user to be re-authenticated and a new session initiated.

In FIG. 3A, in response to successful authentication of the user and establishment of a session at 304, in this example, interface governor 112 fetches from enterprise database 108 all of the record types and commands available for the particular user of mobile device 104. In some implementations, the availability of a subset of record types and a subset of commands for the user can be governed by the user's given role in an enterprise or other attributes of the user.

Figure 4:
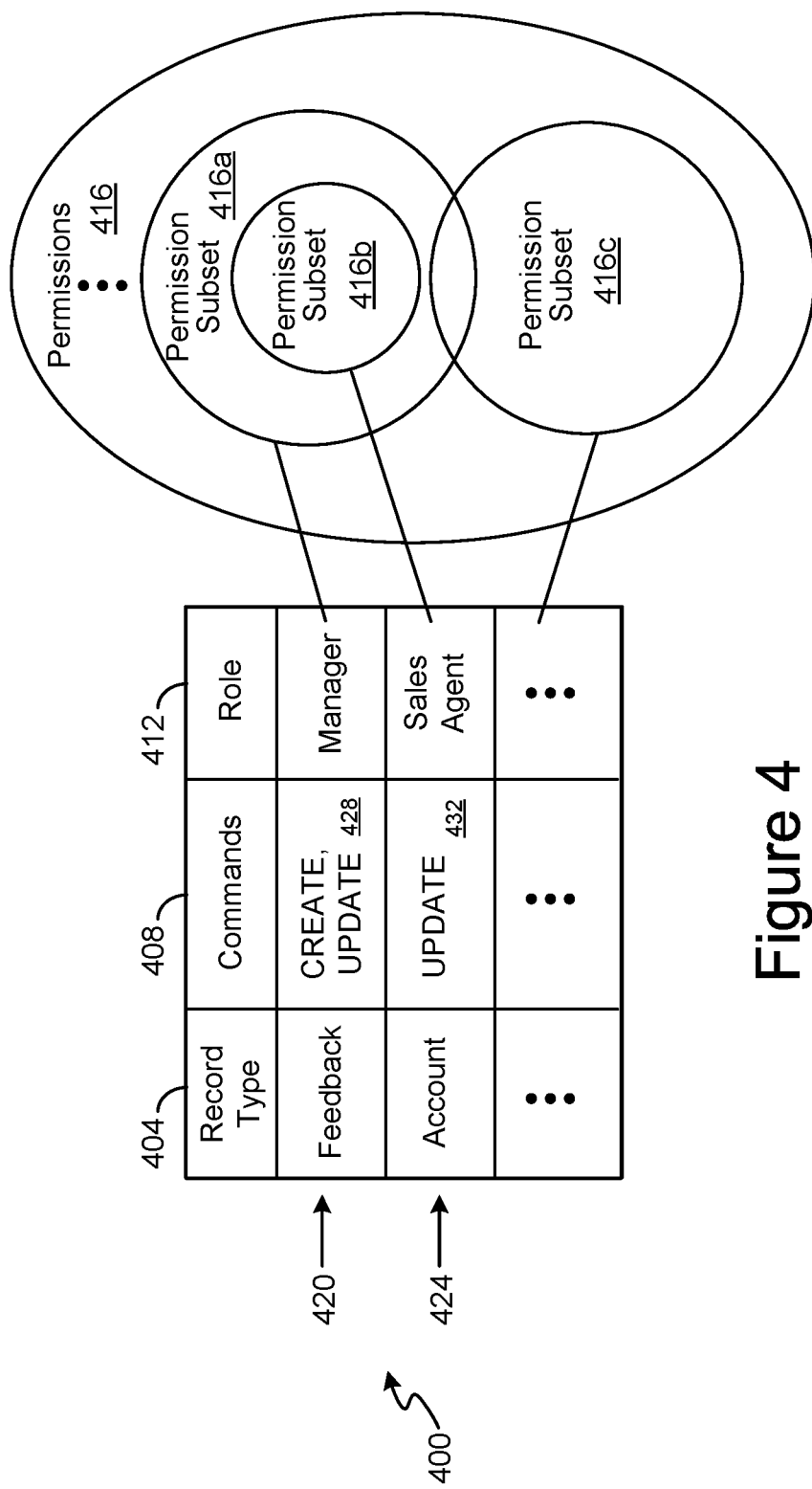
FIG. 4 shows an example of a database table 400 for tracking commands and record types available to users based on associated permission sets, in accordance with some implementations.

FIG. 4 shows an example of a database table 400 for tracking commands and record types available to users based on associated permission sets, in accordance with some implementations. In FIG. 4, a database table 400 can be maintained in a database or other memory accessible to interface governor 112, by way of example, that links available record types 404 and available commands 408 with a given user role 412, which a user may be assigned for an enterprise. As illustrated in FIG. 4, each role is linked with a subset of available permissions 416, which can therefore control the availability of record types and commands for a user having a specified role. For example, as shown in row 420 of table 400, a manager having a permission subset 416a can perform only create and update commands on a feedback record. On the other hand, a user having a sales agent role linked with a different permission subset 416b can only perform an update command on accounts, as shown in row 424. Other various roles can be linked with additional permission subsets, such as subset 416c in FIG. 4.

In some implementations, permission subsets 416a-416c can be tailored to regulate access to various types of records stored in enterprise database 108 of FIG. 1. For example, if permission subset 416b for sales agents restricts those users from having access to certain tasks, contacts, contracts, etc., those record types are omitted from row 424 and will therefore not be displayed as options in a menu or other prompt to the sales agent. By the same token, in the example of FIG. 4, both managers and sales agents are restricted from performing delete commands on records of any type. Thus, "delete" does not appear in cell 428 or 432.

Returning to FIG. 3A, at 306, database table 400 can be populated using the results of the fetch to enterprise database 108 and maintained in cache 128 of interface governor 112 for the entire session. Thus, when a user makes selections and enters data as part of method 300, interface governor 112 can quickly use the mappings of table 400 to retrieve and output relevant data and selections for display on mobile device 104 without having to retrieve such information from enterprise database 108. At 308, in this example, interface governor 112 generates a prompt for the user to select a command using the available commands to that user retrieved from database table 400. This prompt is then transmitted through telecom operator 116 to mobile device 104 for display to the user.

Figure 5:
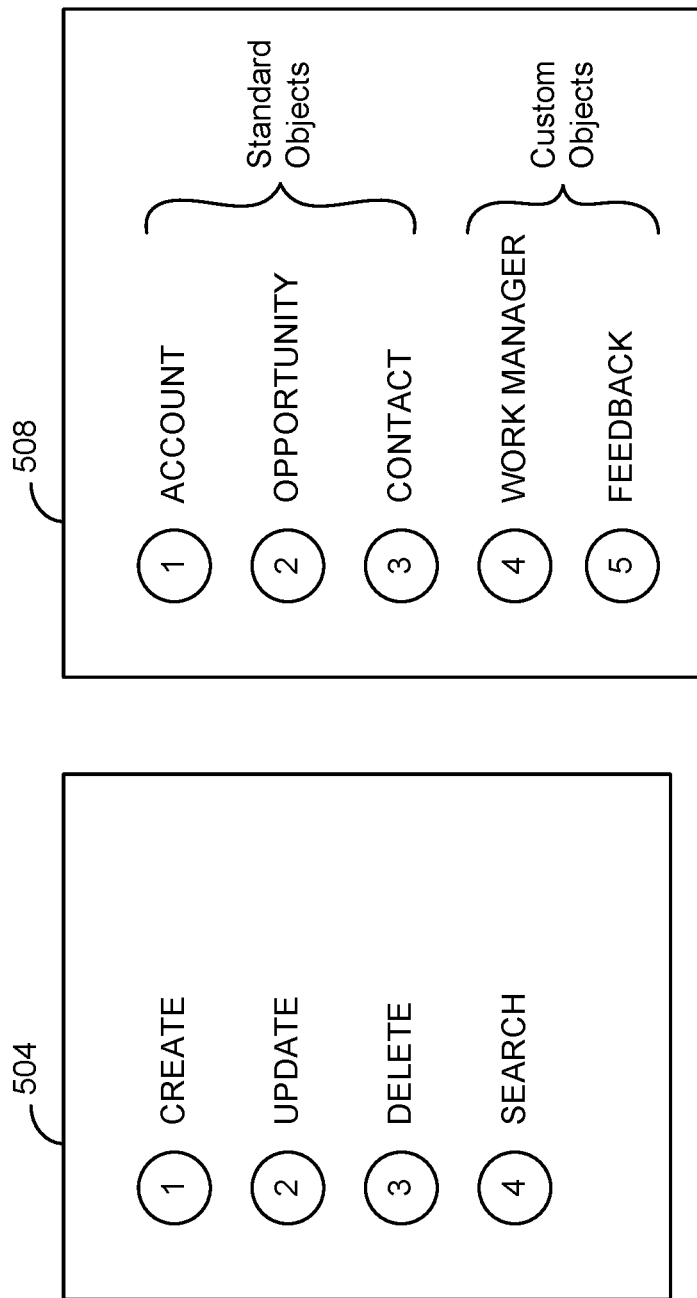
FIG. 5 shows examples of user interfaces (UIs) presenting menus of available commands and record types for display on a mobile device, in accordance with some implementations.

FIG. 5 shows examples of user interfaces (UIs) presenting menus of available commands and record types for display on a mobile device, in accordance with some implementations. As shown in FIG. 5, the prompt generated at 308 of FIG. 3A includes a menu 504 with a list of available commands. In this example, there are four selections including 1—create, 2—update, 3—delete and 4—search. In some implementations, the first time command menu 504 is displayed on mobile device 104, menu 504 includes a default prioritization of available commands Over the course of a session or multiple sessions, as the user's most-frequently-used commands are tracked as described above, selections 1-4 are rearranged in order of most-frequently-used. As mentioned above, adaptive machine learning engine 132 can be engaged to track the frequency of usage of commands by the user over a specified timeframe. By tracking such usage, adaptive machine learning engine 132 can customize what is displayed in menu 504 and the order in which selections are displayed. For example, over a designated timeframe such as an hour, a day, a week, a month, etc., adaptive machine learning engine 132 can determine that the user rarely or never performs delete operations. Thus, in menu 504 of FIG. 5, selection 3—delete can be omitted or replaced with another command Thus, the available commands and hierarchy of commands in menu 504 is customized based on historical learning of how the user interacts with interface governor 112.

Returning to FIG. 3A, after a prompt such as menu 504 of FIG. 5 is sent from interface governor 112 to mobile device 104, at 310, a user can make a selection of one of the available commands. In the example of FIG. 5, numbers 1-4 in menu 504 correspond to key presses on mobile device 104. Thus, a user can hit "1" to create something, "2" to update something, etc. In this example, at 310 of FIG. 3A, the text message generated at mobile device can include only the number 1, which is sent through telecom operator 116 to interface governor 112. After interface governor 112 determines that the session of 304 is still valid, at 312, user input parser 124 parses and validates the text message at 314, and "1" is identified at 316 is a create command Returning to 312, if the session has timed out or otherwise been invalidated, a notification can be generated at 313 and transmitted to mobile device 104 to alert the user.

In FIG. 3A, following identification of the selected command at 316, interface governor 112 identifies available record types mapped to the command using privilege data stored in cache 128 such as database table 400 of FIG. 4. For example, the create command can be linked with a subset of available record types for a user having a specified role to act upon. In FIG. 3A, at 320, interface governor 112 generates a prompt for the user to select a record type and transmits the prompt to mobile device 104. For example, the prompt generated at 320 can include a menu 508 of FIG. 5 with a prioritized list of available record types, which the user has the privilege of creating. In the example of FIG. 5, as with the prioritization of selections in menu 504, the list of available record types is prioritized according to most-frequently-accessed by the user, except in situations where menu 508 is displayed for the first time as a default list. In the example of FIG. 5, menu 508 includes a subset of available record types for the user to create, in this example, 1—account, 2—opportunity, 3—contact, 4—work manager and 5—feedback. These selections can be re-organized, added to or deleted over time using adaptive machine learning engine 132, in similar fashion as the list of commands in menu 504. Returning to FIG. 3A, at 322, a user can make a selection in menu 508. In this example, the user presses "5" to create a feedback record, and the number 5 is captured and sent as a text message from mobile device 104 back to interface governor 112.

When the text message of 322 is received at interface governor 112 through telecom operator 116, session validation as described above at 312 and 313 are again performed at 324 and 325. After text is parsed and validated at 326, interface governor 112 identifies the selected record type using historical data maintained in cache 128, in similar fashion as the identification of the command at 316. Because the historical data in cache 128 is used to identify commands and record types at 316 and 328, such operations can be performed without interface governor 112 having to query enterprise database 108.

In some implementations, the lists of available commands and available record types in menus 504 and 508 of FIG. 5 correspond to the historical data maintained in cache 128 using adaptive machine learning engine 132. Thus, through repeated interactions with the user by prompting the user to select commands and record types using the techniques described above, lists of most-frequently-used commands and most-frequently-accessed record types within the historical data can be updated at 330 of FIG. 3B accordingly. Thus, for future prompts and menus displayed to the user, the menu can be better tailored to the user's behavior as a direct result of the user's history of selections as monitored by interface governor 112.

In FIG. 3B, following the identification of a user-selected command and user-selected record type, at 332, mandatory fields required by interface database 108 to carry out the specific command on the specific record type are identified. As with the lists of previously identified commands and record types in cache 128, previously identified mandatory fields for the specific command and record type can also be stored as historical data. When such fields are not in cache, at 336, a template for the selected record type can be fetched from enterprise database 108. For instance, the account template maintained by enterprise database 108 can designate several mandatory fields, for which data must be gathered for the create command to be carried out. By the same token, when the template or mandatory fields of the template were previously stored in cache 128, the mandatory fields can be retrieved from cache 128 rather than performing the fetch operation of 336.

At 338, interface governor 112 generates one or more prompts for the user to enter or select data to complete the mandatory fields, and such prompts are communicated through telecom operator 116 to mobile device 104. For instance, in the case of a user having instructed interface governor 112 to create a feedback object using menus 504 and 508 of FIG. 5, prompts generated at 338 of FIG. 3B can request that the user enter mandatory field data such as name, feedback content, ratings in various categories, etc. In some implementations, a single prompt can request the user to enter such data in comma-separated sets. In some other implementations, each item of mandatory field data can be gathered by a separate prompt, that is, by sending a sequence of prompts to mobile device 104. When the user enters such data, at 340 of FIG. 3B, the data is passed as one or more text messages back to interface governor 112.

After session validation is again performed at 342 and 343, and the received text message or messages are parsed and validated at 344, code generator 136 of interface governor 112 can generate or retrieve code identifying APIs or Java code for enterprise database 108 to carry out the specified command on the specified record or record type using the mandatory field data entered by the user, at 346. The mandatory field data can be packaged with the code and transmitted from interface governor 112 to enterprise database 108. For example, comma-separated sets of mandatory field data can be structured by interface governor 112 for processing by enterprise database 108. For instance, to create a feedback object, the mandatory field data can be structured as [name, feedback content, ratings]. In another example, to create an account object, three mandatory fields exist, so the mandatory field data can be structured as [name, number of employees, partner]. Each item in the comma-separated set corresponds to a particular mandatory field of the selected record type consistent with the template for that record type previously retrieved by interface governor 112.

In FIG. 3B, after receiving a package of code and mandatory field data from interface governor 112, enterprise database 108 can carry out the specified command at 348. In some implementations, when additional non-mandatory fields exist for the specified record, a notification can be sent from enterprise database 108 back to interface governor 112, so at 350, interface governor 112 can generate one or more prompts for the additional non-mandatory field data. Such field data can be gathered from the user in similar fashion as operations 338-344 described above. Any non-mandatory field data gathered by interface governor 112 can be communicated back to enterprise database 108 to complete the creation or updating of the record at 352. When the command has been fully carried out on the record, an appropriate notification can be generated by interface governor 112 at 354 and relayed back to mobile device 104.

Returning to the user authentication and session establishment at 304 of FIG. 3A, a number of operations can be performed to set up the user and mobile device 104 for session management. By way of illustration, a user can register his or her cell phone number with a provider of enterprise database 108. The provider can assign a 10-digit SMS-only number through telecom operator 116 based on the user's geo-location. For instance, if the user is in India, a telecom provider in India will provide the specific SMS-only number. For additional security, two-factor authentication can be provided as described in greater detail below. In addition, timeouts can be customized and defined for a given session. At 302 of FIG. 3A, a text message generated at 302 can include a keyword identifiable by interface governor 112 to trigger authentication of the user and establishment of a session. For example, a text message can include a start keyword along with the user's login ID and a designated URL, all of which can be interpreted by interface governor 112.

By way of illustration, at 302 of FIG. 3A, a user types a URL, such as area51.salesforce.com, and the user's login ID into a text message and sends the text message to interface governor 112 through SMS-only number 120. Because two-factor authentication is provided, the user only enters his or her login ID, such as joe.smith@salesforce.com. The user is not permitted to include a password linked with that ID. For example, the text message can be structured as a comma-separated tuple [URL, login ID].

At 304 of FIG. 3A, interface governor 112 can determine that the text message was sent from a particular mobile phone number registered to the user for mobile device 104. For example, a database maintained by interface governor 112 in cache 128 or at a different memory location can store a list of users and registered mobile numbers. In some implementations, the user is required to register his or her mobile number with the provider of enterprise database 108 as a prerequisite to being able to send text messages or otherwise interact with interface governor 112.

As part of the user authentication of 304, interface governor 112 can validate that the text message with the URL and login ID is coming in from a legitimate mobile device and a legitimate user having an account with the database system provider. For example, when interface governor 112 identifies the URL and login ID in the text message, interface governor 112 can send the URL and login ID to enterprise database 108 to query database 108 whether the login ID is present. When the URL and login ID are present, enterprise database 108 sends an acknowledgment back to interface governor 112. Upon receiving the acknowledgment, interface governor 112 can proceed with stage two of the two-factor authentication by requesting a password. In other words, interface governor 112 can send a prompt back to mobile device 104 through telecom operator 116 requesting that the user enter the password.

When the user enters his or her password and sends a text message including the password back to interface governor 112 through telecom operator 116, the password can be validated in similar fashion as the login ID, as described above. If the password is valid, user authentication is then completed by interface governor 112, and interface governor 112 can proceed by notifying mobile device 104 of the authentication or immediately preceding with a prompt requesting the user to take further action. For example, in FIG. 3A, after fetching data at 306, a prompt can be generated at 308. In some other implementations, a more generalized prompt can be transmitted to mobile device 104, asking the user to specify a record, record type or command. In such situations, in response to a user's answers to the prompts, additional information can be gathered to carry out a specific command on a specific record or record type in similar fashion as described above in method 300.

Figure 6A:
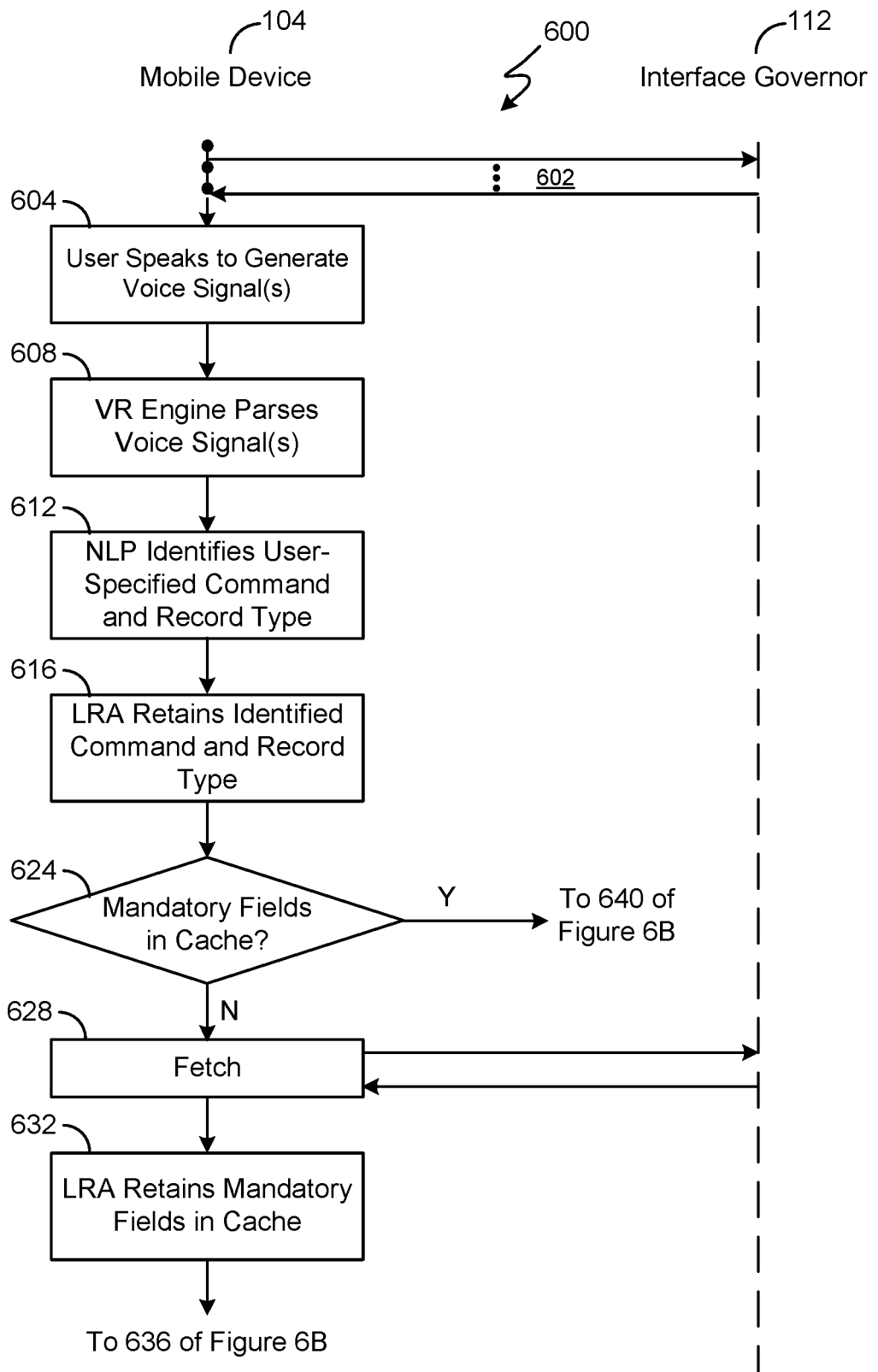
FIGS. 6A and 6B show a flowchart of an example of a method 600 for facilitating voice-based interaction by a mobile device with an enterprise database, in accordance with some implementations.
Figure 6B:
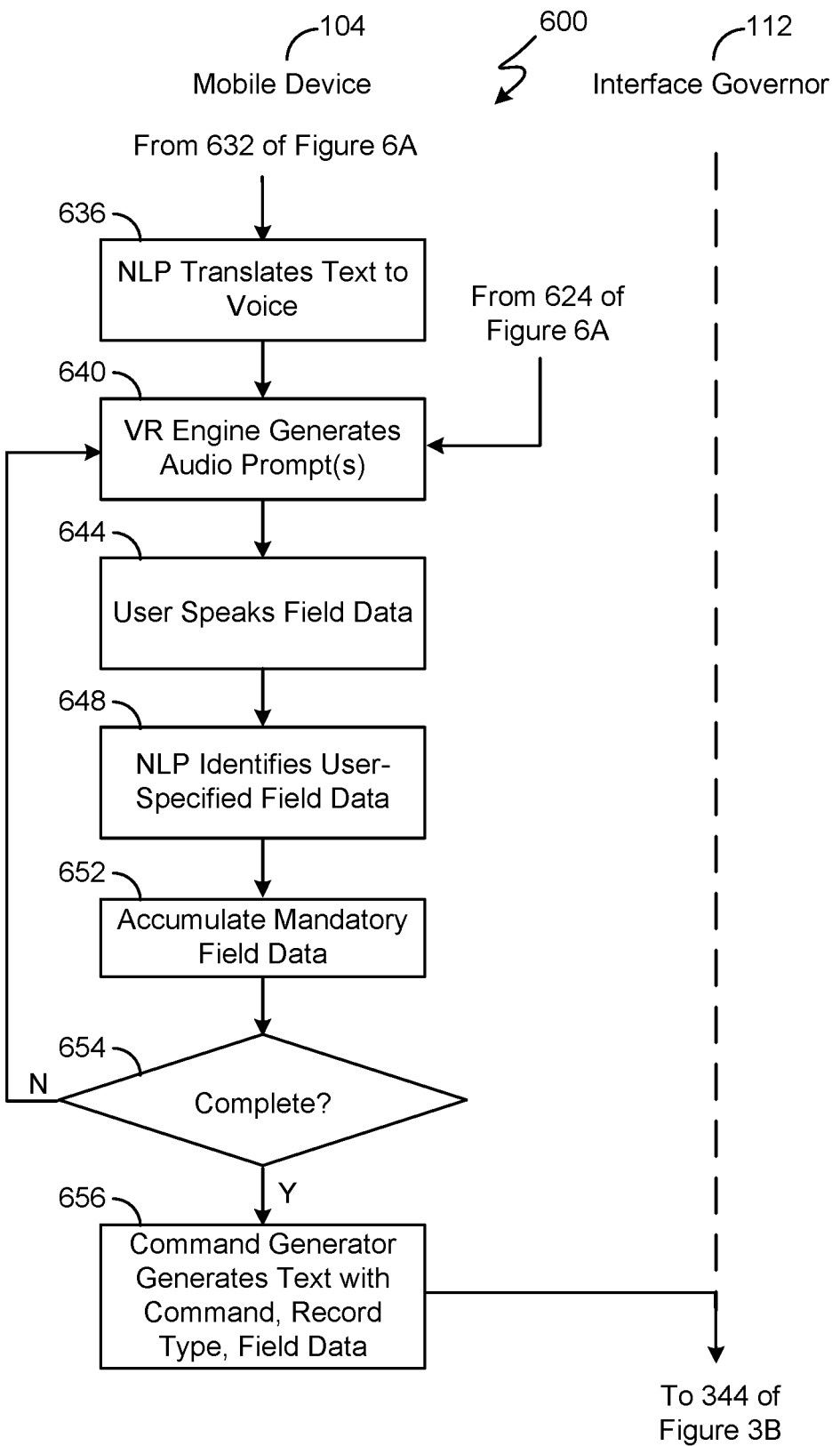

FIGS. 6A and 6B show a flowchart of an example of a method 600 for facilitating voice-based interaction by a mobile device with an enterprise database, in accordance with some implementations. The method 600 of FIGS. 6A and 6B is described with reference to system 200 of FIG. 2, although those skilled in the art should appreciate that method 600 is not limited to the example of FIG. 2. In some implementations, at 602, the method 600 can include user authentication and session establishment operations similar in some respects to those described at 304 of FIG. 3A. For example, when the user activates voice app 204, a login ID and password can be required to authenticate the user. Also, while not shown in FIG. 6A, a preliminary operation can include mobile device 104 interacting with interface governor 112 to retrieve record types and commands available to the user, in similar fashion as described above at 306 of FIG. 3A. For example, the user's role can be used to index database table 400 of FIG. 4, as described above.

In FIG. 6A, at 604, the user speaks into a microphone of mobile device 104 to generate a voice signal or signals, and this can be done in response to audio prompts played through a speaker of the mobile device. At 608, voice recognition engine 208 parses the voice signals. Thus, at 612, NLP 216 can identify a user-specified command and user-specified record type in the parsed signals. At 616 of FIG. 6A, LRA 220 retains the identified command in association with the identified record type in a local memory such as cache 224. Those skilled in the art should appreciate that cache 224 can be implemented as a hardware cache of mobile device 104 or a software cache provided by voice app 204 of FIG. 2.

Returning to FIG. 6A, at 624, rather than immediately send a text message identifying the command and record type to interface governor 112, language builder 212 checks whether mandatory fields for the identified command and record type are already stored in cache 224. If so, flow proceeds to 640 described below. As with operation 332 of FIG. 3B, when the mandatory fields are not identified in cache 224, at 628, mobile device 104 can request a template specifying the mandatory fields from interface governor 112, which can obtain the mandatory fields as described above at 336 of FIG. 3B. For example, language builder 212 can fetch an eXtensible Markup Language (XML) file from interface governor 112. Such an XML file can provide the template retrieved from enterprise database 108. Such an XML file can specify which fields are mandatory and which fields are optional.

The mandatory and any non-mandatory fields can then be stored in cache 224 at 632. In some implementations, at 632, mandatory fields are retained in cache only if a frequency threshold is satisfied. For example, caching of mandatory fields can be performed only in situations where the user is creating more than one account or other record type in a day. The frequency threshold can be customized as desired for the particular implementation.

In FIG. 6B, at 636, NLP 216 translates the text received from interface governor 112, such as an XML file, from text-to-voice. Thus, at 640 of FIG. 6A, voice recognition engine 208 can generate one or more audio prompts requesting the user to speak mandatory field data into the microphone of mobile device 104. For example, the user can be prompted with an audio request message telling the user, "I need employee size." When the user speaks the number, language builder 212 can store the number in cache 224 and provide additional prompts appropriate to gather data for any remaining mandatory fields from the user.

When the user speaks the mandatory field data into the microphone at 644 of FIG. 6B, language builder 212 can identify the user-specified field data at 648 using NLP 216 as described above at 612 of FIG. 6A. In some implementations, LRA 220 and cache 224 can be triggered to retain field data for the session or some other designated timeframe.

As mandatory field data is accumulated by language builder 212 at 652 of FIG. 6B, in some implementations, unless and until all of the mandatory field items are gathered, language builder 212 will not make further communications to interface governor 112. At 654 of FIG. 6B, the operations at 640, 644 and 648 of FIG. 6B can be repeated to generate additional audio request messages, where each request message prompts the user to enter a single field data item.

After all of the data is accumulated, at 656, command generator 228 of FIG. 2 generates text which can be in the form of a file or bundle of files with the command, record type and mandatory field data all specified. Thus, the first time the user wishes to create an account, language builder 212 will fetch the mandatory fields for creating the account from enterprise database 108 through interface governor 112 of FIG. 1. However, when the user later instructs language builder 212 to create another account, for instance, with a different name, language builder 212 will not fetch mandatory fields. This is because the mandatory fields for an account were previously retrieved when the earlier account was created and stored in cache 224. The mandatory fields can be retrieved from cache 224, assuming the designated retention timeframe has not passed since the earlier account was created.

In FIG. 6B, at 656, command generator 228 is capable of translating voice keywords such as "create" and "account" from voice to text. In other words, the command and record type are translated to corresponding textual keywords. Command generator 228 is configured to then send the text keywords and any accompanying mandatory field data items from mobile device 104 to user input parser 124 of interface governor 112 of FIG. 1. Value data sets identifying a command, record type, mandatory field data and any other useful data items can be constructed for the desired implementations. For example, command generator 228 can be configured to initially generate a 4-tuple for the first command received from a user in a given session, such as {CREATE, Account, Twitter, 000XAH212wp9Pj}, where the first value is the command, the second value identifies the type of record, the third value is user-defined data such as the name of the record, and the fourth value is the session ID. In such implementations, subsequent data structures generated by command generator 228 can be in the form of 5-tuples such as {CREATE, 000XAH212wp9Pj, Twitter, Employees, 200} and {CREATE, 000XAH212wp9Pj, Twitter, Type, Partner}, where the first value is the command, the second value is the session ID, the third value is the name of the record type or other user-defined data, the fourth value designates a mandatory field, and the fifth value identifies the field data to populate that mandatory field.

At 656 of FIG. 6B, the text containing or identifying the command, record type and any mandatory field data can be in various formats, such as an XML file. When command generator 228 sends the text to user input parser 124 of interface governor 112, user input parser 124 can identify and parse the text for further processing, as described above in FIGS. 3A and 3B, to carry out the specified command on the specified record type with mandatory fields populated using the user-specified data. The same or similar operations as described above that 344-354 of FIG. 3B can then be carried out by interface governor 112 of FIG. 1.

Some non-limiting examples of systems, apparatus, and methods are described below for implementing database systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a database system. The data can include general information, such as name, title, phone number, a photo, a biographical summary, and a status, e.g., text describing what the user is currently doing. The data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Figure 7A:
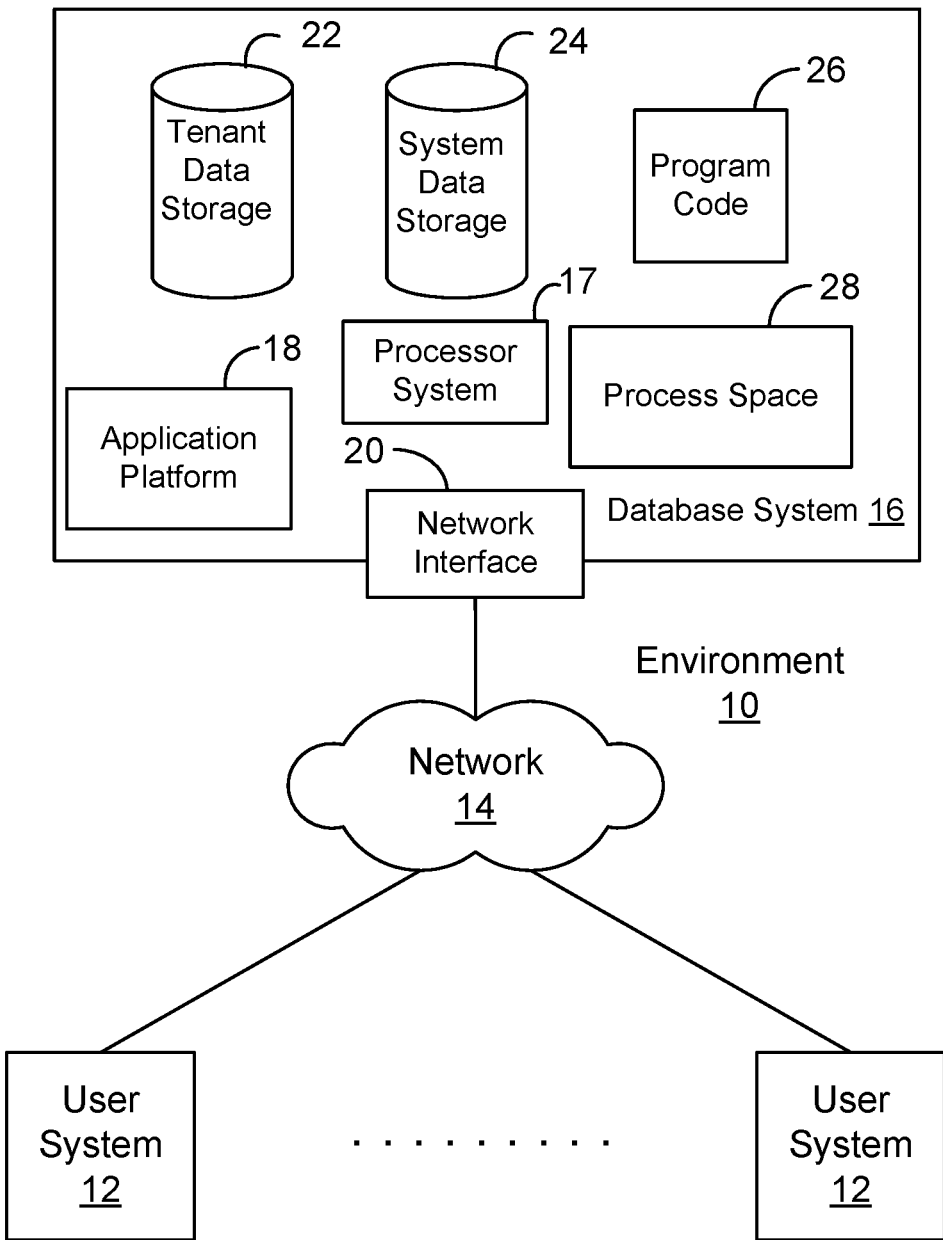
FIG. 7A shows a block diagram of an example of an environment 10 in which an on-demand database service can be used in accordance with some implementations.

FIG. 7A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 7A (and in more detail in FIG. 7B) user systems 12 might interact via a network 14 with an on-demand database service, which is implemented in the example of FIG. 7A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 7A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7B:
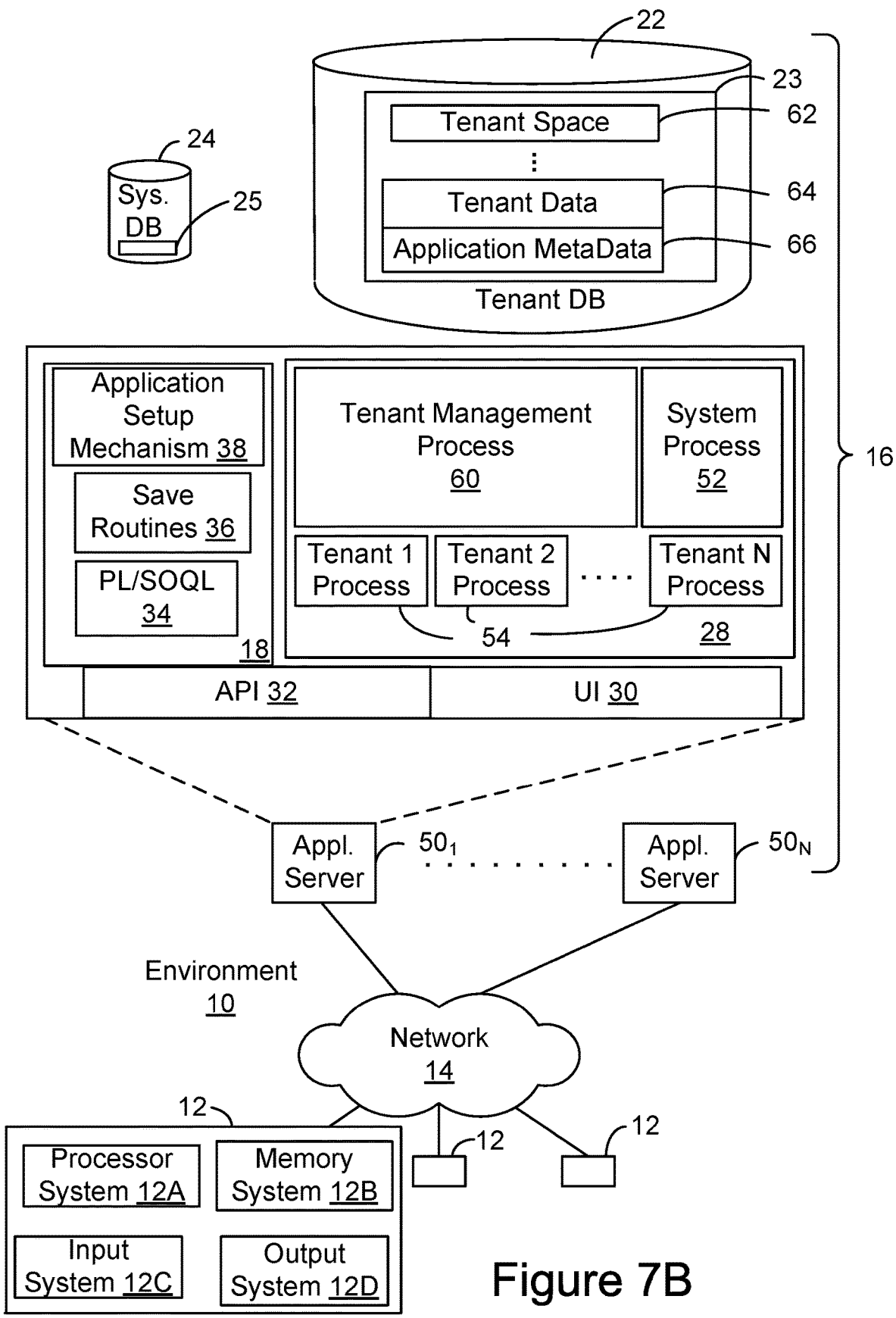
FIG. 7B shows a block diagram of an example of some implementations of elements of FIG. 7A and various possible interconnections between these elements.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 7A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 7B shows a block diagram of an example of some implementations of elements of FIG. 7A and various possible interconnections between these elements. That is, FIG. 7B also illustrates environment 10. However, in FIG. 7B elements of system 16 and various interconnections in some implementations are further illustrated. FIG. 7B shows that user system 12 may include processor system 12A, memory system 12B, input system 12C, and output system 12D. FIG. 7B shows network 14 and system 16. FIG. 7B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 7A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 7B, system 16 may include a network interface 20 (of FIG. 7A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8A:
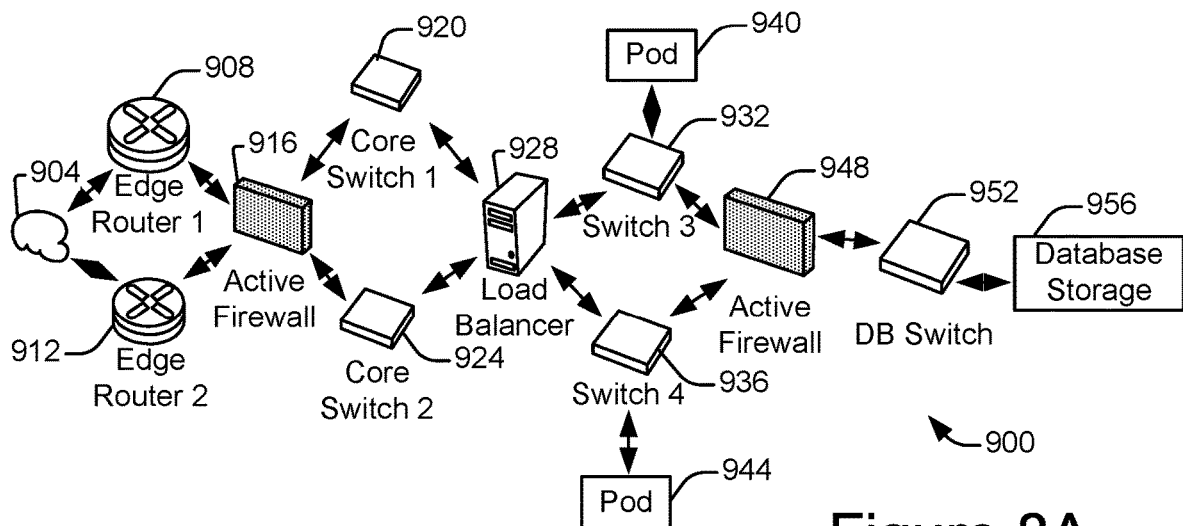
FIG. 8A shows a system diagram of an example of architectural components of an on-demand database service environment 900, in accordance with some implementations.

FIG. 8A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 8B:
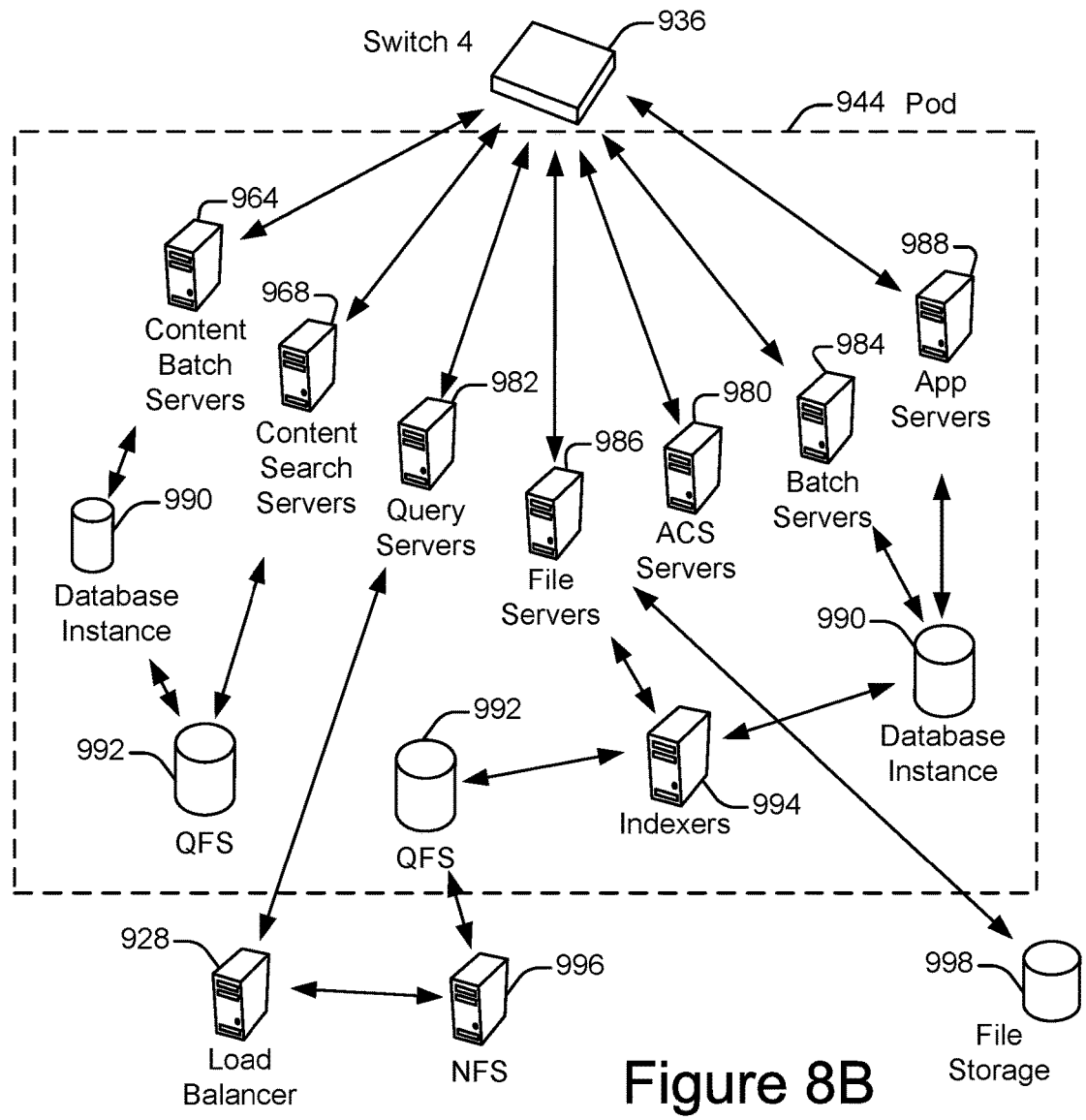
FIG. 8B shows a system diagram further illustrating an example of architectural components of an on-demand database service environment, in accordance with some implementations.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 8B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 8A and 8B.

FIG. 8B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above with reference to FIGS. 1-6B by instructing another computing device to perform an operation. In some implementations, one or more application servers $50_1$-$50_N$ carry out, either partially or entirely, one or more of the disclosed operations described with reference to FIGS. 1-6B. In some implementations, app servers 988 of FIG. 8B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein, including operations described above with reference to FIGS. 1-6B. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above with reference to FIGS. 1-6B. For instance, database tables and CRM databases can be maintained in tenant data storage 22 and/or system data storage 24 of FIGS. 7A and 7B. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for facilitating interaction with a digital assistant on a mobile device, the system comprising:
   a server system comprising a memory and one or more processors, the server system configurable to cause:
   providing, for display at a mobile device, a user interface (UI) with integrated voice communication, the UI configurable to receive data entries from a user and track tasks for the user to accomplish;
   obtaining, from the mobile device, a question or a command through a session, the question or the command comprising an identification of a specific record in a database and a request to view details of the specific record;
   processing the question or the command, the processing comprising using machine learning and parsing one or more linguistic constructs of the question or the command;
   acting on the question or the command by at least retrieving information associated with the question or the command;
   interacting with the mobile device through the session, the interacting comprising providing a response to the question or the command, the response comprising the details of the specific record;
   obtaining, from the mobile device, a request to perform an action in relation to the specific record, the requested action comprising one or more of adding a product or updating a price to a customer relationship management (CRM) record implemented as a lead or an opportunity stored in a CRM database; and
   performing the requested action in relation to the specific record, the performing of the requested action comprising the one or more of adding the product or updating the price to the CRM record.

2. The system of claim 1, wherein the server system is configurable to communicate with the mobile device, at least in part, by text messaging in the form of short messaging service (SMS).

3. The system of claim 1, wherein the specific record is a contact, and the details of the specific record comprise one or more of: job title, affinity, buying role, phone number, or notes on the contact.

4. The system of claim 1, wherein the requested action on the specific record comprises one or more of: add a note on a contact, view details of an account, view details of an opportunity, view details of a case, or view details of a lead.

5. The system of claim 1, wherein the details of the specific record comprise an identification of new leads assigned to the specific record.

6. The system of claim 1, wherein processing a command comprises identifying the command as a voice command.

7. The system of claim 1, wherein processing a question or a command comprises analyzing enterprise-specific and domain-specific vocabulary.

8. The system of claim 1, wherein processing a question or a command comprises processing complex queries and deriving intelligence from one or more enterprise applications associated with a customer relationship management (CRM) system.

9. A computer program product comprising computer-readable program code capable of being executed by one or more processors when retrieved from a non-transitory computer-readable medium, the program code comprising instructions configurable to cause:
   providing, for display at a mobile device, a user interface (UI) with integrated voice communication, the UI configurable to receive data entries from a user and track tasks for the user to accomplish;
   obtaining, from the mobile device, a question or a command through a session, the question or the command comprising an identification of a specific record in a database and a request to view details of the specific record;
   processing the question or the command, the processing comprising using machine learning and parsing one or more linguistic constructs of the question or the command;
   acting on the question or the command by at least retrieving information associated with the question or the command;
   interacting with the mobile device through the session, the interacting comprising providing a response to the question or the command, the response comprising the details of the specific record;
   obtaining, from the mobile device, a request to perform an action in relation to the specific record, the requested action comprising one or more of adding a product or updating a price to a customer relationship management (CRM) record implemented as a lead or an opportunity stored in a CRM database; and
   performing the requested action in relation to the specific record, the performing of the requested action comprising the one or more of adding the product or updating the price to the CRM record.

10. The computer program product of claim 9, wherein the specific record is a contact, and the details of the specific record comprise one or more of: job title, affinity, buying role, phone number, or notes on the contact.

11. The computer program product of claim 9, wherein the requested action on the specific record comprises one or more of: add a note on a contact, view details of an account, view details of an opportunity, view details of a case, or view details of a lead.

12. The computer program product of claim 9, wherein the details of the specific record comprise an identification of new leads assigned to the specific record.

13. The computer program product of claim 9, wherein processing a question or a command comprises analyzing enterprise-specific and domain-specific vocabulary.

14. The computer program product of claim 9, wherein processing a question or a command comprises processing complex queries and deriving intelligence from one or more enterprise applications associated with a customer relationship management (CRM) system.

15. A method comprising:

provliding, for display at a mobile device, a user interface (UI) with integrated voice communication, the UI configurable to receive data entries from a user and track tasks for the user to accomplish;

obtaining, from the mobile device, a question or a command through a session, the question or the command comprising an identification of a specific record in a database and a request to view details of the specific record;

processing the question or the command, the processing comprising using machine learning and parsing one or more linguistic constructs of the question or the command;

acting on the question or the command by at least retrieving information associated with the question or the command;

interacting with the mobile device through the session, the interacting comprising providing a response to the question or the command, the response comprising the details of the specific record;

obtaining, from the mobile device, a request to perform an action in relation to the specific record, the requested action comprising one or more of adding a product or updating a price to a customer relationship management (CRM) record implemented as a lead or an opportunity stored in a CRM database; and performing the requested action in relation to the specific record, the performing of the requested action comprising the one or more of adding the product or updating the price to the CRM record.

16. The method of claim 15, wherein the specific record is a contact, and the details of the specific record comprise one or more of: job title, affinity, buying role, phone number, or notes on the contact.

17. The method of claim 15, wherein the requested action on the specific record comprises one or more of: add a note on a contact, view details of an account, view details of an opportunity, view details of a case, or view details of a lead.

18. The method of claim 15, wherein the details of the specific record comprise an identification of new leads assigned to the specific record.

19. The method of claim 15, wherein processing a question or a command comprises analyzing enterprise-specific and domain-specific vocabulary.

20. The method of claim 15, wherein processing a question or a command comprises processing complex queries and deriving intelligence from one or more enterprise applications associated with a customer relationship management (CRM) system.

* * * * *